United States Patent

Schmitt

[15] 3,704,444

[45] Nov. 28, 1972

[54] SEISMIC DATA PROCESSING METHOD AND SYSTEM

[72] Inventor: Arthur N. Schmitt, Houston, Tex.

[73] Assignee: Western Geophysical Company of America, Houston, Tex.

[22] Filed: June 1, 1970

[21] Appl. No.: 42,347

[52] U.S. Cl. .................. 340/15.5 DP, 340/15.5 CP
[51] Int. Cl. ........................ G01v 1/24, G01v 1/30
[58] Field of Search ........................... 340/15.5 DP

[56] References Cited

UNITED STATES PATENTS

| 3,340,499 | 9/1967 | Hadley ............... 340/15.5 DP |
| 3,419,853 | 12/1968 | Silverman ........... 340/15.5 DP |
| 3,440,599 | 4/1969 | Waters et al ........ 340/15.5 DP |

OTHER PUBLICATIONS

Millman et al, "Electronic Devices and Circuits", 67, 486–491, Pub. by McGraw-ill

*Primary Examiner*—Benjamin A. Borchelt
*Assistant Examiner*—N. Moskowitz
*Attorney*—Michael P. Breston, Alan C. Rose, Walter R. Thiel and Alfred B. Levine

[57] ABSTRACT

In a digital seismic data processing system the reflected seismic signals are received in analog form. An analog-to-digital converter samples or measures at equal time intervals the analog signals and converts the sampled signals into a sequence of digital numbers. By the process of digital filtering, arithmetic operations are then used to multiply consecutive values of the digital numbers by a prescribed set of numbers and to add the resulting products together. This invention contemplates also using the process of digital filtering to produce a digital feedback signal which is converted into an analog feedback signal. The analog feedback signal is combined in real time with the arriving, noise-containing, analog seismic signal to substantially completely remove the noise from the arriving raw signal prior to processing it through the seismic data processing system.

8 Claims, 2 Drawing Figures

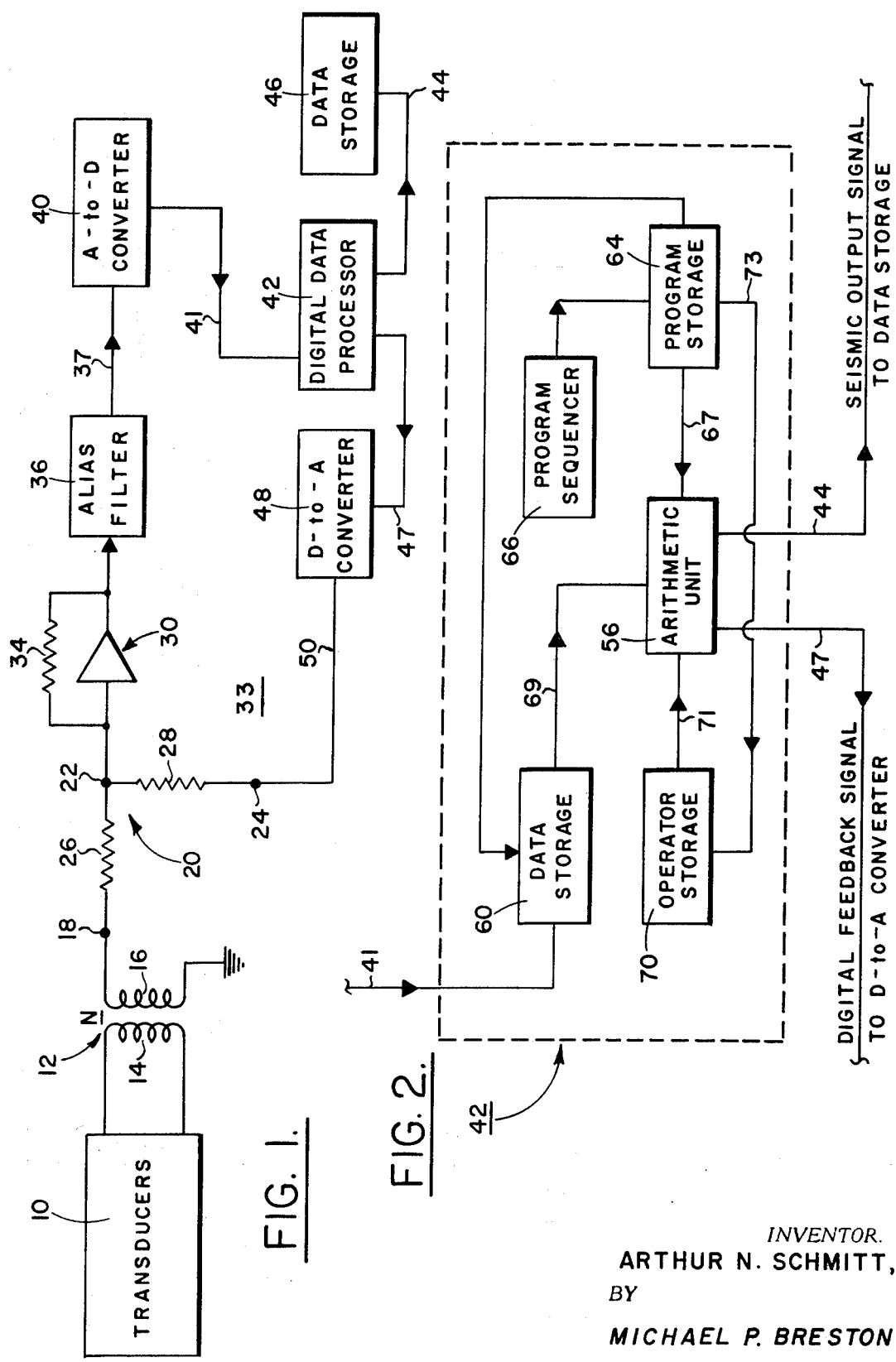

SEISMIC DATA PROCESSING METHOD AND SYSTEM

BACKGROUND OF THE INVENTION

In each channel of a digital seismic data processing system, the detected raw signal, as provided by the mechanical-to-electrical transducers includes a signal portion which contains desirable seismic information and a portion which contains only undesired noise. Ordinarily, the noise-to-signal ratio is relatively high, hence the gain of the first amplifying stage is purposely reduced to allow both the seismic signal portion and the noise portion to become amplified without appreciable distortion. Because the gain of the amplifier is maintained at a reduced level, the relatively-high, self-generated noise within the amplifier itself increases the noise-to-signal ratio at the output of the amplifier.

SUMMARY OF THE INVENTION

It is a main object of the present invention to substantially reduce the noise portion from the arriving raw analog signal prior to amplifying the raw analog signal. Digital filtering is employed to generate a digital feedback signal which is converted into an analog feedback signal having the proper parameters for becoming combined in real time with the arriving raw signal. The analog feedback signal is selected to have such frequency, phase, and amplitude as to substantially completely eliminate the undesired noise portion from the raw signal.

BRIEF DESCRIPTION OF THE DRAWINGS

FIG. 1 is a diagrammatic representation in block diagram form of a single channel data acquisition system in accordance with the present invention; and FIG. 2 is a diagrammatic representation of digital filtering used in the system of FIG. 1.

In the drawings, the invention is illustrated with reference to a single seismic data processing channel. It will be understood that ordinarily 24, 36 or 48 of such channels are employed. The manner of adapting the present invention for a multi-channel system using time-sharing and multiplexing techniques is well known in the art. This invention is therefore not limited to any particular number of channels.

Referring now to FIG. 1, raw analog acoustic signals are detected by a plurality of transducers 10, such as geophones or hydrophones. The electric signals from transducers 10 are applied to a transformer 12 which has a primary winding 14, a secondary winding 16, and a transformation ratio N. In prior art systems, N was intentionally kept at a reduced value to avoid saturating the amplifier which follows transformer 12. As will be subsequently described, with the use of the present invention N can be significantly increased.

The output signal from secondary winding 16 is connected to one input terminal 18 of a signal combining network, such as a summing device 20, having a summing junction 22 and another input terminal 24. Connected between terminals 18 and 22 is a resistor 26, and between terminals 22 and 24 is a resistor 28. From summing junction 22 the signal is fed to an analog amplifier 30 which is typically an operational amplifier having a feedback resistor 34. The amplified signal from amplifier 30 is fed through an alias filter 36 to an analog-to-signal (A-to-D) converter 40.

Thus the signal on the filter's output line 37 is sampled or measured at equal time intervals to provide, to the output line 41 from the A-to-D converter 40, a sequence of numbers known in the art as a "time series." This time series is applied to a digital data processor 42 which provides via one output line 44 the desired digital data for storage in a digital data storage 46.

The processor 42 also provides via another line 47 a digital feedback signal which is converted by a digital-to-analog (D-to-A) converter 48 into an analog feedback signal. This analog feedback signal is fed via line 50 to the input terminal 24.

Referring now to FIGS. 1 and 2, the processor 42 typically includes a data storage or buffer 60 which receives via line 41 the time series. Buffer 60 has sufficient temporary storage capacity to store the necessary number of samples. A suitable program for carrying out the required operations is stored in a program storage 64. The stored program includes information relative to the various operations which the digital processor 42 is required to accomplish. A program sequencer 66 acts as a clock to actuate the program storage 64. An arithmetic unit 56 receives information via line 67 from the program storage 64, via line 69 from the buffer 60, and via line 71 from an operator storage 70. The operator storage 70 includes the necessary filtering parameters and its operation is controlled via line 73 from the program storage 64.

In operation, when an analog signal is sampled or measured at equal time intervals, the resulting sequence of numbers is the time series. The term "digital filtering" refers to the arithmetic operations of multiplying consecutive values of the time series by a prescribed set of numbers and adding the resulting products together. The prescribed set of numbers are called the "filter coefficients" and the number of such coefficients is called the "filter length". A value obtained by this process of multiplying and summing is called an "output point" of the filter. The processor 42 could therefore be called a "digital filter" which provides output points via line 44 for storage in the data storage 46, and provides output points via line 47 to the D-to-A converter 48.

From converter 48, the analog feedback signal is available for algebraic addition in real time at the summing junction 22. The analog feedback signal is obtained on the basis of data already sampled. The filter coefficients of the digital data processor 42 are selected so as to reject the undesired noise component from the raw analog signal arriving at the summing junction 22. Using general feedback techniques, this noise component can be attenuated by 60 to 80 DB.

To summarize the operation of the system of this invention, the raw analog signal arrives from transducers 10 to the input terminal 18 of summer 20. The feedback loop 33, which includes amplifier 30, filter 36, A-to-D converter 40, processor 42, and D-to-A converter 48, provides an analog feedback signal via line 50 to the input terminal 24 of summer 20. This analog feedback signal has an amplitude, frequency, and phase so that, when algebraically added to the arriving raw analog signal at input terminal 18, there is obtained at the summing junction 22 a combined signal from which the undesired noise component has been substantially completely eliminated.

Only a very small sample of the undesired noise signal passes through amplifier 30 and becomes greatly amplified by the gain of the feedback loop 33 to produce the needed analog feedback signal for application to the input terminal 24 of summer 20.

Accordingly the analog signal now passing through filter 36, A-to-D converter 40, the digital data processor 42 is substantially free of the undesired noise signal. Digital data processor 42 supplies to the data storage 46 only the desired seismic signal contained in the incoming raw analog signal.

Since the undesired noise signal is substantially removed from the input 22 to the amplifier 30, transformer 12 can now be provided with a relatively greater turns ratio N, thereby allowing a larger amplitude signal to appear on input terminal 18. Without the feedback loop 33, a relatively-large amplitude signal at input terminal 18 would tend to saturate the analog amplifier 30 thereby leading to undesirable signal distortions. Also, the gain of amplifier 30 can now be substantially increased, since amplifier 30 is only required to amplify the desired seismic portion of the incoming raw signal. Using a larger than ordinarily allowed gain for the amplifier 30 minimizes the effect of the noise generated by the active components in the amplifier 30.

The invention accordingly allows the substantially complete removal of the undesired noise prior to amplifying the raw signal by amplifier 30. In this manner, much of the initially gathered raw analog signal is effectively filtered before it is allowed to enter the seismic data acquisition system.

What I claim is:

1. A method of processing seismic data including the steps of:
    a. receiving from the earth a raw analog electric signal comprising (1) a seismic component signal resulting from a seismic disturbance transmitted into the earth and (2) a noise component signal;
    b. combining in an electrical circuit said raw analog signal with a network generated analog feedback signal to obtain a resultant analog signal which is substantially free of said noise component signal;
    c. amplifying said resultant analog signal;
    d. sequentially sampling the amplitude of said resultant analog signal;
    e. converting the amplitude of each sample into digital data;
    f. processing said digital data to provide a digital feedback signal;
    g. converting said digital feedback signal into said analog feedback signal; and
    h. using said analog feedback signal in step b).

2. The method of claim 1 wherein,
said processing step f) also provides said seismic component signal in digital form for storage in a storage device.

3. The method of claim 2 and,
filtering said resultant analog signal after it is amplified in step c) and before it is converted into digital data in step e).

4. The method of claim 1 wherein,
said processing of said digital data in step f) includes:
multiplying said sampled amplitudes by prescribed filter coefficients selected to substantially remove said noise signal component from said resultant signal; and
summing the products resulting from said multiplying step.

5. A system for processing seismic data comprising:
means detecting from the earth a raw analog electric signal, said signal comprising a desired seismic component signal resulting from a seismic disturbance transmitted into the earth and an undesired noise component signal;
means combining in an electrical circuit said raw analog signal with a network generated feedback analog signal to provide a resultant analog signal which is substantially free of said noise component signal;
means amplifying said resultant analog signal;
means sequentially sampling the amplitude of said resultant analog signal;
means converting the amplitude of each sample into digital data;
computer means for processing said digital data to provide a prescribed digital feedback signal; and
means converting said digital feedback signal into said feedback analog signal.

6. The system of claim 5 wherein said computer processing means further provides said desired seismic component signal in digital form, and
storage means for storing said desired seismic digital signal.

7. The system of claim 6 and further including:
means filtering said resultant analog signal, said filtering means being coupled to the output of said amplifying means.

8. In a system for processing an electric analog signal received from the earth, said signal including a seismic component signal, having amplitude and frequency variations corresponding to seismic information, and a noise component signal corresponding to undersired noise, said system including at least one channel digital field recorder system to record during field operations a succession of said incoming electric signals received by signal receiving means, the improvement comprising:
an electric summing device having at least one input coupled to the signal receiving means and another input coupled to the output of a feedback loop;
said feedback loop including:
an amplifier having an input coupled to the output of said summing device,
a filter network having an input coupled to the output of said amplifier,
an analog-to-digital converter for converting the output analog data from said filter,
a data processor adapted to process the digital data from said analog-to-digital converter and to provide a feedback digital signal and an output digital seismic signal,
a digital-to-analog converter for converting said feedback digital signal into an analog feedback signal,
electric conductor means free from the earth for conducting said analog feedback signal to said another terminal of said summing device; and
said summing device adding said analog feedback signal to said incoming analog signal to thereby substantially decrease the noise component signal from said seismic component signal at the output of said summing device.

* * * * *